(12) United States Patent
Gouriet et al.

(10) Patent No.: US 7,289,893 B2
(45) Date of Patent: Oct. 30, 2007

(54) METHOD FOR EVALUATING INSTANTANEOUS FREQUENCY OF MECHANICAL EXCITATION EXERTED ON A MOTOR VEHICLE WHEEL

(75) Inventors: Pascal Gouriet, Chatillon (FR); Zahir Djama, Paris (FR)

(73) Assignee: Peugeot Citroen Automobiles S.A., Velizy Villacoublay (FR)

( * ) Notice: Subject to any disclaimer, the term of this patent is extended or adjusted under 35 U.S.C. 154(b) by 487 days.

(21) Appl. No.: 10/496,374

(22) PCT Filed: Nov. 7, 2002

(86) PCT No.: PCT/FR02/03822

§ 371 (c)(1),
(2), (4) Date: Oct. 29, 2004

(87) PCT Pub. No.: WO03/045718

PCT Pub. Date: Jun. 5, 2003

(65) Prior Publication Data

US 2006/0082077 A1      Apr. 20, 2006

(30) Foreign Application Priority Data

Nov. 28, 2001 (FR) .................................. 01 15385

(51) Int. Cl.
*B60G 17/00* (2006.01)
(52) U.S. Cl. ......................................... 701/37; 280/5.5
(58) Field of Classification Search .................. 701/37, 701/38, 91; 73/11.08; 280/5.507, 5.515, 280/5.5, 5.503
See application file for complete search history.

(56) References Cited

U.S. PATENT DOCUMENTS

| | | | |
|---|---|---|---|
| 4,616,848 A | 10/1986 | Sugasawa et al. | |
| 4,634,142 A | 1/1987 | Woods et al. | |
| 4,685,698 A * | 8/1987 | Klinkner et al. | ......... 280/5.515 |
| 5,369,974 A * | 12/1994 | Tsymberov | ................ 73/11.08 |
| 5,398,184 A | 3/1995 | Yamaoka et al. | |
| 5,588,721 A * | 12/1996 | Asano et al. | ............... 303/163 |
| 5,692,587 A | 12/1997 | Fratini, Jr. | |
| 5,696,677 A * | 12/1997 | Leaphart et al. | .............. 701/37 |
| 5,721,681 A | 2/1998 | Borschert et al. | |
| 5,897,130 A | 4/1999 | Majeed et al. | |
| 5,948,961 A | 9/1999 | Asano et al. | |
| 5,999,868 A | 12/1999 | Beno et al. | |
| 6,142,026 A | 11/2000 | Ohashi et al. | |
| 6,164,665 A | 12/2000 | Lentz et al. | |
| 6,249,728 B1 | 6/2001 | Streiter | |
| 2001/0044685 A1 | 11/2001 | Schubert | |

FOREIGN PATENT DOCUMENTS

FR     2 683 776     5/1993

* cited by examiner

*Primary Examiner*—Dalena Tran
(74) *Attorney, Agent, or Firm*—Leydig, Voit & Mayer, Ltd.

(57) ABSTRACT

A method for evaluating instantaneous frequency of a mechanical excitation exerted on a motor vehicle wheel by the uneven surface of a road, based on measurements of observable parameters such as those related to the instantaneous height of the chassis and/or the wheel of the vehicle. The method includes a filtering procedure producing successive estimates of the instantaneous height of the chassis and of the wheel, a lag extracting procedure, producing an estimated value of the time lag between the height estimations, and a frequency estimating procedure, producing the desired evaluation of the frequency based on the estimated time lag value.

20 Claims, 11 Drawing Sheets

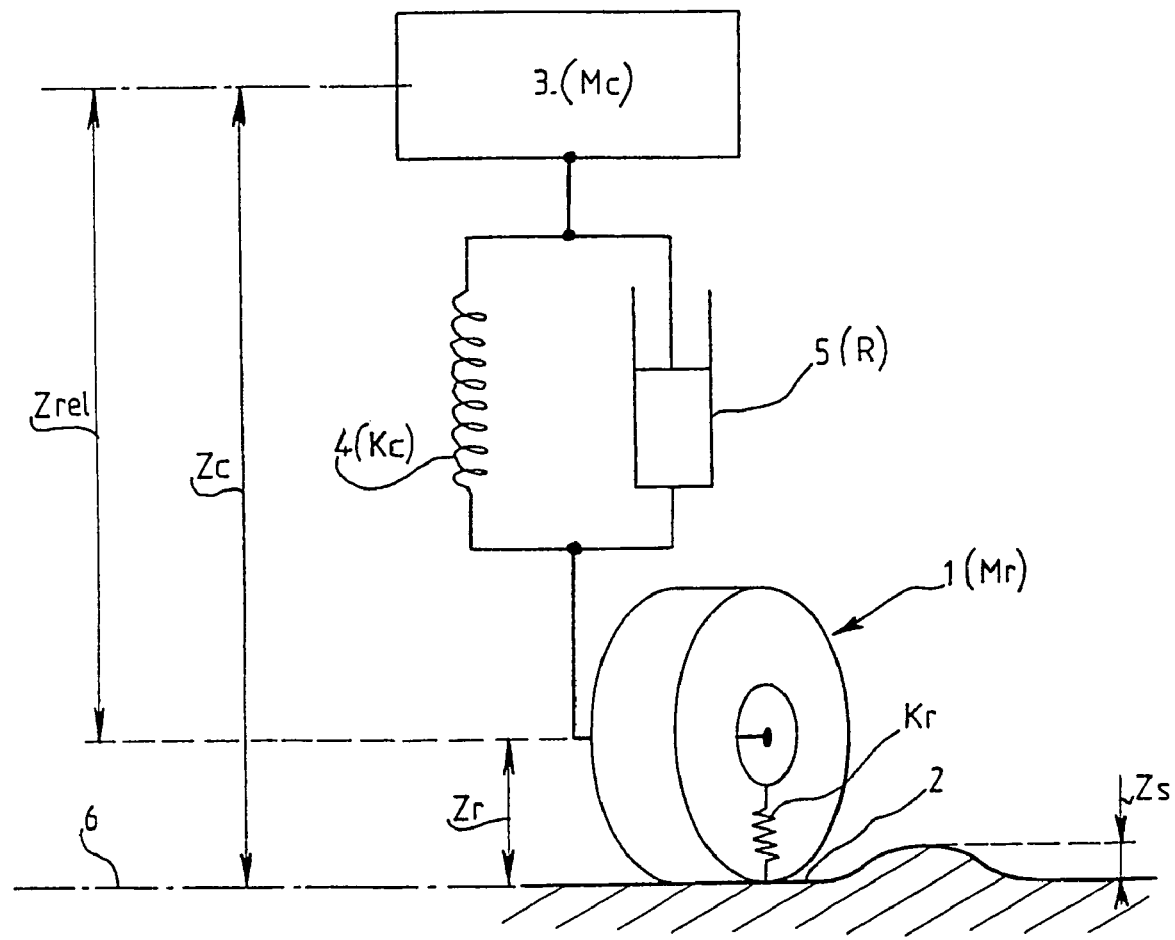
_Fig. 1_

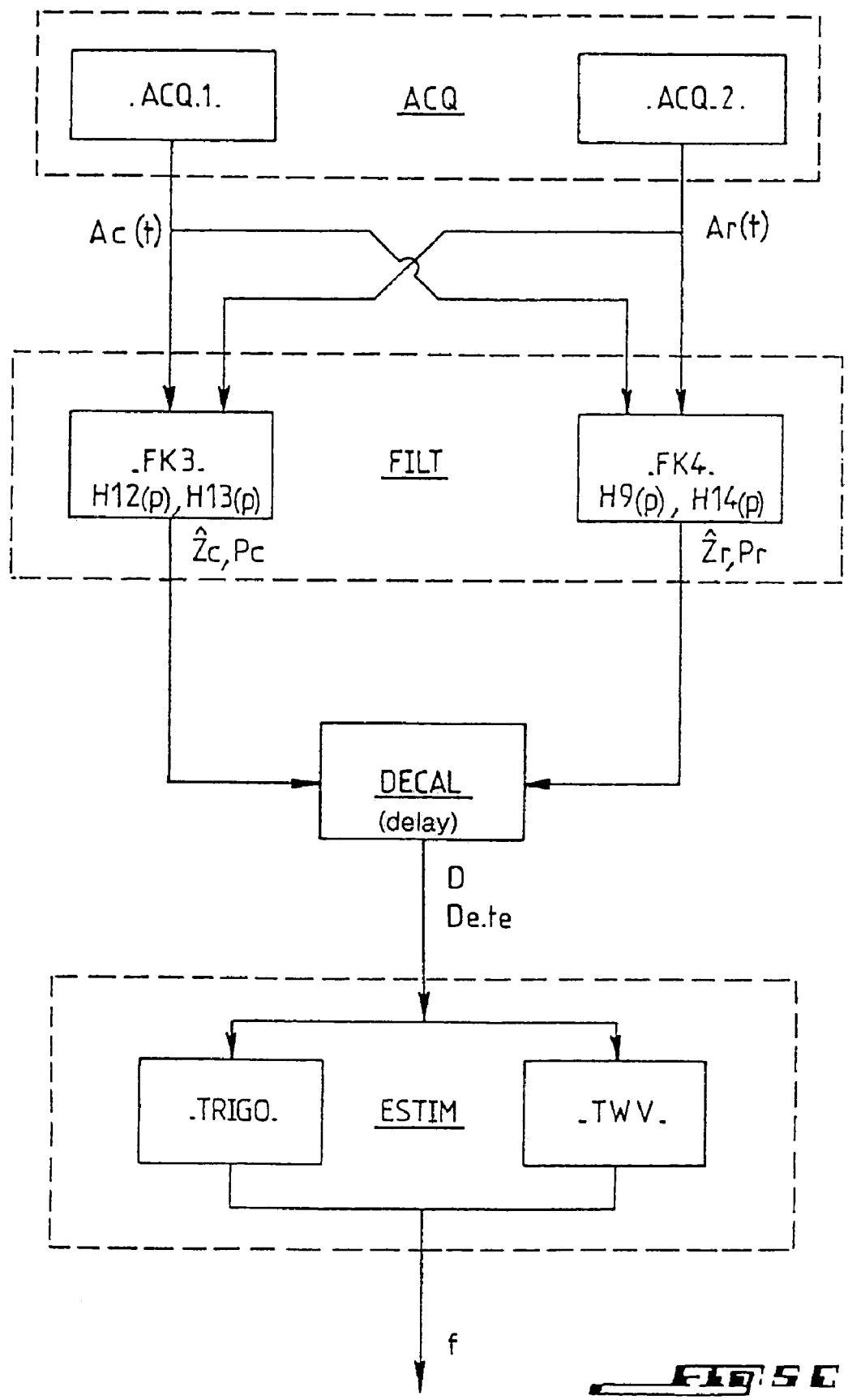

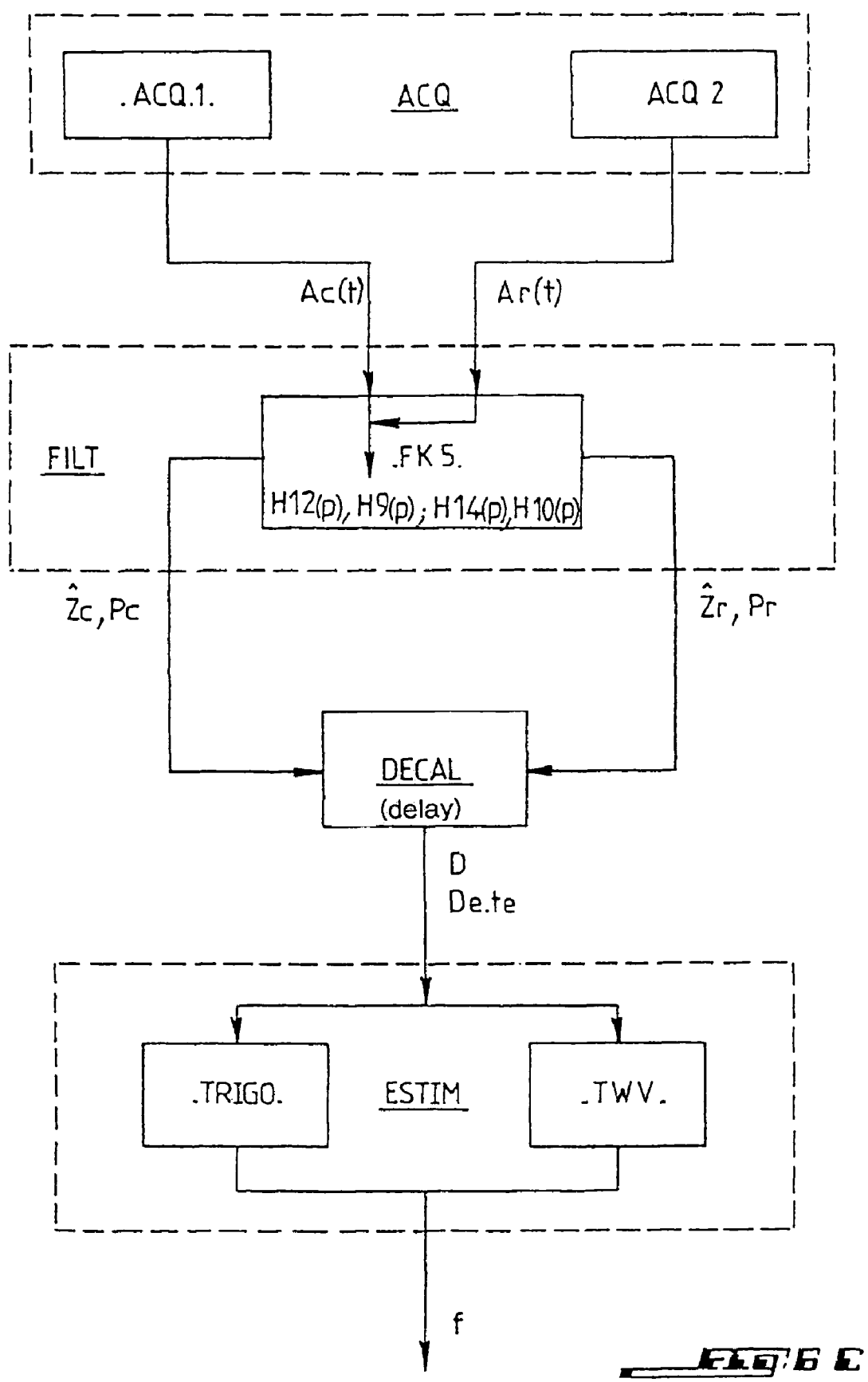

METHOD FOR EVALUATING INSTANTANEOUS FREQUENCY OF MECHANICAL EXCITATION EXERTED ON A MOTOR VEHICLE WHEEL

The present invention concerns, in general, signal processing techniques and their application to monitoring and/or controlling the dynamic behavior of a motor vehicle.

BACKGROUND

Methods of this type are known in the prior art, as indicated notably in the patents FR-2 683 776, FR-2 787 066, FR-2 719 260, EP-0 743 204, and U.S. Pat. No. 5,497,324.

The patent FR-2 683 776 proposes a method for obtaining a signal which represents the surface of the road in real time, this method being based on detection of the relative displacements measured by a sensor which is sensitive to the travel of the body with respect to at least one wheel (spring travel).

The signal representative of the road profile is obtained by filtering.

Conventional methods, such as the Fast Fourier Transform (FFT), are then applied for spectral analysis of the filtered signal, and calculation of the means and deviations, on the basis of a classification that takes into account appropriate characteristics which are notably related to the road profile and type.

This method, which is incapable of processing measurement noise or of achieving a temporal localization of the detected frequencies, presents intrinsic limitations of precision.

The patent FR-2 787 066 concerns an active suspension system which comprises active support groups which are arranged between the body and the wheels of the vehicle.

Each one of these groups consists of a passive spring and of a regulation device which allows the possibility of an excursion, and which is series connected to the corresponding passive spring.

These groups are controlled as a function of the accelerations imposed on the body, where a low-pass filtering procedure applied to the signals produced by the accelerometers and displacement sensors permits taking into account the high frequency and low frequency components in a differentiated matter.

A frequency-dependent damping is obtained by frequency modulation of the travel acceleration signals, where this modulation is the result of the combined effect of a low-pass filter, an amplifier, and a summer.

This technique has several specific limitations and defects.

First, it ignores the delay between the time that the acceleration sensor detects the movement of the body and the time that the excitation is produced which generates this movement of the body, so that the frequency which is estimated by modulation is marred by systematic error.

Moreover, this technique is inappropriate for the identification and temporal localization of the instantaneous frequency.

Finally, the frequencies of the filters are chosen a priori, on a theoretical basis, and thus are not capable of undergoing adaptation, and the effect of the shock absorber is not processed in certain frequency bands.

The patent FR-2 719 260 describes a method for controlling shock absorber regulation devices as a function of a signal which originates from an acceleration sensor.

To separate the oscillation mode due to the body from the oscillation mode due to the wheel, this signal is split by low-pass filtering and band-pass filtering, where the low-pass filtering has a cutoff frequency between 15 and 20 Hz to include the natural frequency of vibration of the wheel, and the band-pass filtering has a band width between 0.75 and 2.5 Hz, centered around a frequency of 1.5-2 Hz, to take into account the oscillation mode due to the body.

The same remarks can be formulated as for the preceding cases: this technique does not enable taking into account errors in the model and measurement noise.

The patent EP-0 743 204 describes a method for control of a vehicle chassis that uses processing of signals delivered by an ABS sensor to construct an observation system which allows control and command of the vehicle suspensions.

This method is based on the idea that the speed of wheel rotation is proportional to the travel speed of the suspensions (in expansion or compression), to exploit the hypothesis that the frequency components of the wheel speed and suspension travel signals are the same.

This method, which uses a low-pass filtering with a cutoff frequency of 1 Hz for displacement of the body and a low-pass filtering with a cutoff frequency of 10 Hz for displacement of the wheel, calls for the same remarks as were made about the above-mentioned methods.

U.S. Pat. No. 5,497,324 proposes a method which is based on the use of the travel speed of the displacements between the wheel and the body for observation of a semi-active suspension.

Observation of the frequency is achieved by measuring the time which separates two changes in the direction of the load on this suspension, where the period is taken to be the inverse of the frequency to the nearest $2\pi$.

A sign change half-period equal to 500 msec is thus taken as the manifestation of the oscillation mode due to the body, a sign change half-period equal to 50 msec is taken as the manifestation of the oscillation mode due to the wheel, and a half-period of intermediate duration is taken as the manifestation of an oscillation mode related to [passenger] comfort.

However, to the extent that, in the general case, the excitation frequency at the level of the ground has already undergone variation at the time when the sensor detects a movement of the body or of the wheel, this method comprises a systematic error.

Moreover, this method in theory is applicable only to sinusoidal signals which are not phase-shifted, and to periodic signals whose frequency does not vary instantaneously.

Finally, this method, insofar as the noise of the sensors and the modeling errors are concerned, calls for the same remarks as those formulated above.

In this context, the purpose of the invention is to propose a method which allows the evaluation, in a more precise and more rigorous manner than in the prior art, of the instantaneous frequency of a mechanical excitation exerted on a motor vehicle wheel by the uneven surface of the road on which a vehicle is driven.

For this purpose, the method of the invention comprises:
a filtering method which uses at least the first measurement time series to produce at least a first derived principal time series that consists of successive estimates of the instantaneous height of the chassis, and a second derived principal time series that consists of successive estimates of the instantaneous height of the wheel,
a time lag extracting procedure, which uses at least the first derived principal series and the second derived principal series to produce a preparatory time series, which consists of successive estimated values of an instantaneous time lag between the instantaneous height of the chassis and the instantaneous height of the wheel, where each estimated value of the time lag is obtained by the optimization of at least one correlation function of the first derived principal time series and the second derived principal time series, and a frequency estimating procedure that uses the preparatory time series to produce a final time series which consists of successive estimated values of the instantaneous frequency of a mechanical excitation, where each frequency value is obtained, in an observation time window defined by the corresponding estimated value of the instantaneous time lag, as the frequency at which this instantaneous time lag constitutes an instantaneous phase shift.

While it is useful to integrate the measurement noise and modeling errors, the filtering method uses at least the first measurement time series to produce a first derived time series comprising, in addition to the first derived principal time series, a first derived auxiliary time series which consists of successive variance values that are respectively associated with the estimates of the first derived principal time series, and a second derived time series comprising, in addition to the second derived principal time series, a second derived auxiliary time series which consists of successive variance values that are respectively associated with the estimates of the second derived principal time series, and where each estimated value of the time lag is obtained by the optimization of at least one correlation function correlating the first derived time series and second derived time series.

For example, at least some of the measurement samples elaborated during the course of the acquisition procedure and pertaining to an observable parameter represent a relative displacement of the chassis with respect to the wheel.

However, at least some of the measurement samples elaborated during the acquisition procedure and pertaining to an observable parameter can also represent an instantaneous acceleration of the chassis, or of the wheel.

The acquisition method can comprise the elaboration of at least a second measurement time series, consisting of successive measurement samples which represent successive values taken on by a second observable parameter related to the instantaneous height of the chassis and/or of the wheel.

It is preferred for the method of the invention to comprise a prior modeling procedure which comprises, for a physical model associated with the system consisting of the wheel, the suspension devices and the chassis, the elaboration of a first inverse transfer function which takes the first observable parameter as input signal and the instantaneous height of the chassis as output signal, and the elaboration of a second inverse transfer function which takes the first observable parameter as input signal and the instantaneous height of the wheel as output signal.

The prior modeling procedure can also comprise, for the physical model which is associated with the system consisting of the wheel, the suspension devices and the chassis, the elaboration of a third inverse transfer function which takes the second observable parameter as input signal and the instantaneous height of the chassis as output signal, and the elaboration of a fourth inverse transfer function which takes the second observable parameter as input signal and the instantaneous height of the wheel as output signal.

In a variant, the prior modeling procedure can comprise, for the physical model associated with the system consisting of the wheel, the suspension devices and the chassis, the elaboration of a fifth inverse transfer function which takes the second observable parameter as input signal and the instantaneous height of the chassis or of the wheel as output signal, and the elaboration of a sixth inverse transfer function which takes the second observable parameter as input signal and the first observable parameter as output signal.

In all the cases, the filtering procedure is very advantageously implemented using at least one Kalman filter, and possibly at least two or more Kalman filters.

Each correlation function of the first derived time series and the second derived time series can consist of an inter-correlation function for the first and second derived time series.

However, each correlation function correlating the first and second derived time series can also be constructed using a model based on third-order cumulants.

Whenever possible, the procedure for estimating the frequency elaborates, for example, each value of the final time series as the solution, for the corresponding estimated value of the instantaneous phase shift, of at least one equation representing the physical model associated with the system consisting of the wheel, the suspension devices and the chassis.

In the other cases, the procedure for estimating the frequency can elaborate each value of the final time series by the application of a Wigner-Ville transform or a Wigner-Ville pseudo-transform.

The method of the invention has numerous applications, and in particular it can be used for the control of the suspension devices of the vehicle, for the determination of the instantaneous inclination of the chassis, for the determination of the uneven surface of the road, for monitoring the inflation of the wheel, and for the determination of certain characteristics of vehicles such as mass transfer.

BRIEF DESCRIPTION OF DRAWING FIGURES

Other characteristics and advantages of the invention will become clear in the following description, which is given for information and is in no way limiting, with reference to the drawing in the appendix, in which:

FIG. 1 is a diagram representing the elements of a model subsystem consisting of one fourth of a vehicle;

FIGS. 5A to 5C are diagrams representing three variants of a second embodiment of the method of the invention; and FIGS. 6A to 6C are diagrams representing three variants of a third embodiment of the method of the invention.

DETAILED DESCRIPTION

Figure 2:
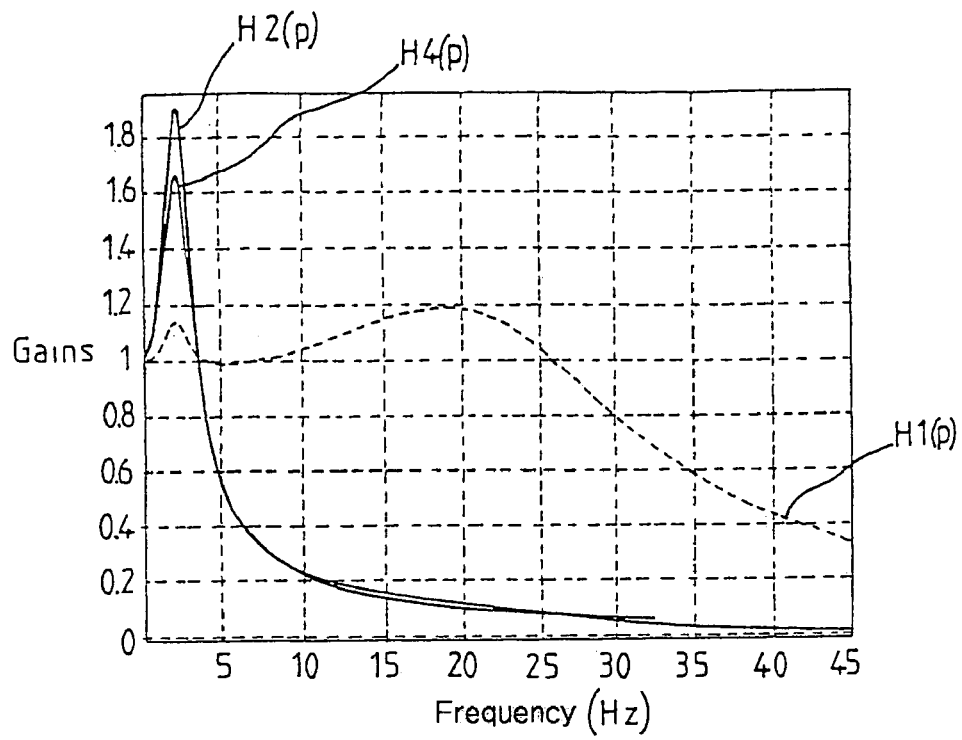
FIG. 2 is a diagram representing the amplitude variation of several transfer functions as a function of frequency.

As indicated above, the invention concerns a method for evaluating the instantaneous frequency of a mechanical excitation exerted on a wheel 1 (FIG. 1) of a motor vehicle traveling on a road 2, and equipped with a chassis 3 that is connected to the wheel by suspension devices 4, 5.

In general, the expression "suspension" is used for an assembly consisting of a spring 4 and a shock absorber 5, and which ensures the mechanical connection between a sprung mass, substantially the chassis 3 of a vehicle, also called "body," and an unsprung mass, for example, a wheel 1.

The operation of this type of suspension is entirely dependent on the environment in which it moves, and especially on the profile of the road.

Thus, the uneven surface of the road on which the vehicle travels exerts, on each wheel of the latter, a mechanical excitation whose instantaneous frequency the method of the invention proposes to evaluate.

The behavior adopted in response to the mechanical excitation by the subsystem formed by the combination of a wheel 1, the associated suspension devices 4, 5, and the fraction of the chassis 3 which is supported by this wheel (FIG. 1), can, in a well known manner, be described by a physical model with two degrees of freedom that involves the physical parameters whose symbols and definitions are given below:

Mc: mass of the chassis supported by the wheel, expressed in kilogram (kg);

Mr: unsprung mass (essentially of the wheel), expressed in kilograms (kg);

Kc: stiffness of the suspension spring, expressed in newtons per meter (N·m$^{-1}$);

Kr: stiffness of the tire, expressed in newtons per meter (N·m$^{-1}$);

R: damping coefficient of the shock absorber, expressed in newton seconds per meter (N·m$^{-1}$·sec);

Zc: instantaneous vertical position (height) of the chassis, expressed in millimeters (mm), with reference to the horizontal reference plane 6;

Zr: instantaneous vertical position (height) of the unsprung mass, expressed in millimeters (mm), with respect to the horizontal reference plane 6;

Zs: instantaneous vertical position (height) of the profile of the road, expressed in millimeters (mm), with reference to the reference horizontal plane 6;

Ar: vertical acceleration of the wheel, expressed in meters per second squared (m·sec$^{-2}$);

Ac: vertical acceleration of the chassis, expressed in meters per second squared (m·sec$^2$).

For greater conciseness, the following parameter will also be used:

Zrel: relative travel of the wheel with respect to the chassis (Zrel=Zr−Zc).

The application of the principles of dynamics to the components of this subsystem makes it possible to construct in a known manner a physical model based on those principles, and to derive therefrom the transfer functions that are defined as the ratio of the Laplace transform of a first physical parameter considered as input signal for this subsystem to the Laplace transform of a second physical parameter considered as output signal of this subsystem.

Using the conventional notation in which the symbol j denotes the imaginary number, that is to say the square root of −1; in which the symbol ω denotes the angular frequency of a periodic signal, related to the frequency f of this the signal by the relation ω=2πf; in which the symbol t denotes time; and in which the symbol p denotes both the time derivative operator of the Laplace transform and the factor j·ω, that is to say the ratio of the time derivative of the function $e^{j \cdot \omega \cdot t}$ to this function itself, it is thus possible to calculate, in particular, the following transfer functions:

$$H_1(p) = \frac{Zr(p)}{Zs(p)} = \frac{Kr(Mcp^2 + Rp + Kc)}{L(p)} \text{ with:}$$

$$L(p) =$$

-continued
$$MrMcp^4 + R(Mc + Mr)p^3 + (MrKc + Mc(Kr + Kc))p^2 + RKrp + KcKr;$$

$$H_2(p) = \frac{Zc(p)}{Zs(p)} = \frac{Kr(Rp + Kc)}{L(p)}, \text{ and}$$

$$H_3(p) = \frac{Ac(p)}{Zs(p)} = \frac{Kr \cdot p^2 \cdot (Rp + Kc)}{L(p)}.$$

In these examples, the transfer function $H_1(p)$ represents the frequency response of the model subsystem, as expressed by the instantaneous vertical position of the wheel (Zr), to the excitation which for this subsystem consists of the vertical variation of the profile of the road (Zs), this transfer function giving information on the greater or lesser propensity of the wheel to remain in contact with the road.

The transfer function $H_2(p)$ represents the frequency response of the model subsystem, as expressed by the instantaneous vertical position of the chassis (Zc), to the excitation which for this subsystem consists of the vertical variation of the profile of the road (Zs), this transfer function giving information on the greater or lesser propensity of the chassis to follow the profile of the road.

Also, the transfer function $H_3(p)$ represents the frequency response of the modeled subsystem, as expressed by the instantaneous vertical acceleration of the chassis (Ac), to the excitation which for this subsystem consists of the vertical variation of the profile of the road (Zs), this transfer function giving information on the comfort of passengers installed in the cabin integral with the chassis.

Other useful transfer functions can be calculated, for example:

$$H_4(p) = \frac{Zc(p)}{Zr(p)} = \frac{(Kc + Rp)}{Mcp^2 + Rp + Kc}$$

$$H_5(p) = \frac{Zc(p)}{(Zr(p) - Zc(p))} = \frac{(Rp + Kc)}{Mcp^2}$$

$$H_6(p) = \frac{(Zr(p) - Zc(p))}{Ac(p)} = \frac{Mc}{(Rp + Kc)}$$

$$H_7(p) = \frac{(Zr(p) - Zc(p))}{Zs(p)} = \frac{H_2(p)}{H_5(p)}$$

$$H_8(p) = \frac{Zr(p)}{(Zr(p) - Zc(p))} = H_4^{-1}(p) \cdot H_5(p) = \frac{Mcp^2 + Rp + Kc}{Mcp^2}$$

$$H_9(p) = \frac{Zr(p)}{Ac(p)} = \frac{Mcp^2 + Rp + Kc}{p^2(Rp + Kc)}$$

$$H_{10}^{-1}(p) = \frac{Ar(p)}{Ac(p)} = \frac{Mcp^2 + Rp + Kc}{(Rp + Kc)}$$

$$H_{11}^{-1}(p) = \frac{Ar(p)}{(Zr(p) - Zc(p))} = \frac{Mcp^2 + Rp + Kc}{Mc}$$

$$H_{12} = \frac{Zc}{Ac} = \frac{1}{p^2}$$

$$H_{13}(p) = \frac{Zc}{Ar} = \frac{Kc + Rp}{p^2(Mcp^2 + R \cdot p + Kc)}$$

$$H_{14}(p) = \frac{Zr}{Ar} = \frac{1}{p^2}$$

If the theoretical values of the different physical parameters which characterize the subsystem studied, that is Mc, Mr, Kc, Kr, and R, are known, it is thus possible to predict the theoretical frequency behavior of this subsystem, which is accounted for by these different transfer functions.

FIG. 2 represents the relative amplitudes or "gains," corresponding to the different transfer functions $H_4(p)$, $H_1(p)$, and $H_2(p)$, as a function of the frequency of excitation, that is to say the factor $\omega/2\cdot\pi$, produced by the uneven surface of the road.

Examination of this figure shows two resonance frequencies, that is to say two frequencies for which these gains are greater than unity.

A first frequency, whose value $(\frac{1}{2}\cdot\pi)\cdot(Kc/Mc)^{1/2}$ is relatively low, corresponds to the oscillation mode due to the body, also called "body mode."

A second frequency, whose value $(\frac{1}{2}\cdot\pi)\cdot(Kr/Mr)^{1/2}$ is relatively high, corresponds to the oscillation mode due to the unsprung mass, also called "wheel mode."

The knowledge and recognition of these two natural vibration modes are important for the control of a vehicle and the synthesis of the control equation for the shock absorbers, to the extent that they allow the identification of the excitation frequency and consequently, the control in real time of the state of the shock absorbers, regardless of their type, with a relatively rapid response time.

Indeed, while the shock absorbers spontaneously fulfill this role, in a satisfactory manner, that is assigned to them by construction and that consists in decreasing the oscillations of the chassis in body mode and in wheel mode, they have, however, a clear tendency to increase these oscillations to values higher than these two natural vibration modes.

The approach taken by the invention consists in using, in combination, the information held a priori on the behavior of the model subsystem and the instantaneous measurements of physical parameters by which this behavior expresses itself, to identify the excitation frequency that the profile Zs of the road, which is a random, immeasurable, not directly observable signal, applies to this subsystem.

However, fundamentally the invention is based on the discovery of the fact that the phase shift between two transfer functions representing the behavior of the modeled subsystem, for example, two of the above-presented transfer functions, is much more valuable information for identification of the excitation signal frequency than is the information that consists of knowledge of the gain of these functions.

Indeed, as shown at least partially in FIG. 2, the information concerning the displacement of the masses undergoes, in terms of gain, much filtering in the high-frequency zone, where the value of the gain rapidly approaches zero and it drowned out in measurement noise above 75 Hz, and even at much lower frequencies for the sprung mass.

Figure 3:
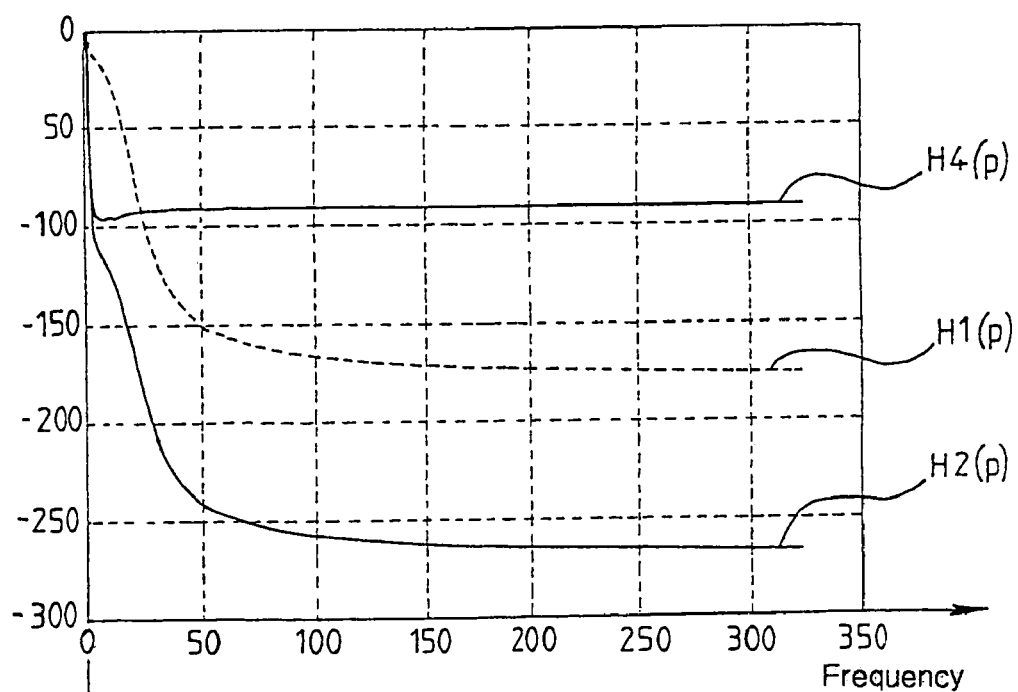
FIG. 3 is a diagram representing the phase variation of several transfer functions as a function of frequency.

The approach taken by the invention, which takes into account the phase shifts of the signals instead of their amplitudes, makes it possible to circumvent this difficulty, as is illustrated in FIG. 3 showing the magnitude of the relative phase shifts corresponding to the different transfer functions $H_4(p)$, $H_1(p)$, and $H_2(p)$, as a function of the frequency of the excitation produced by the uneven surface of the road, that is to say, as a function of the factor $\omega/2\cdot\pi$.

To be put into effect, the method of the invention must first comprise an acquisition procedure, which consists at least in elaborating a first measurement time series that consists of successive measurement samples representing the successive values taken by a first observable parameter related to the instantaneous height of the chassis and/or of the wheel.

In a possible embodiment example, which corresponds to the preferred embodiment of the invention and which will be used throughout the entire description to present the invention, this acquisition procedure consists in periodically acquiring, at a sampling frequency which is at least twice the highest expected excitation frequency, and in storing for future processing measurement signals that are delivered by a travel sensor which is installed between the chassis and the wheel, and that are representative of the instantaneous value of the displacement of the chassis with respect to the wheel, that is to say the magnitude Zrel, equal to Zr−Zc.

The method of the invention also comprises a filtering procedure which allows, at least from the first measurement time series, in this instance from the successive values of Zrel, the generation of at least two series, which will be called "first derived time series," and "second derived time series."

The word "derived," as it is used here, thus must not at all be interpreted as referring to the mathematical operation of differentiation with respect to time, but rather must be understood as indicating that the "first derived time series," and "the second derived time series" are not raw data, but data originating from a processing operation.

The first derived time series comprises at least a first derived principal time series, consisting of successive estimates of the instantaneous height of the chassis, that is successive samples representative of the estimate $\hat{Z}$ c of the magnitude Zc.

It is preferred for the first derived time series to also comprise a first derived auxiliary time series, which consists of successive variance values which are associated, respectively, with the estimates of the first derived principal time series, that is to say it consists of successive samples representative of the variance Pc of the magnitude $\hat{Z}$ c.

Similarly, the second derived time series comprises at least a second derived principal time series which consist of successive estimates of the instantaneous height of the wheel, that is to say of successive samples representative of the estimate $\hat{Z}$ r of the magnitude Zr.

Advantageously, this second derived time series also comprises a second derived auxiliary time series, which consists of successive variance values which are respectively associated with the estimates of the second derived principal time series, that is to say of successive samples representative of the variance Pr of the magnitude $\hat{Z}$ r.

The filtering procedure by which two derived time series are obtained is preferably carried out by the application of signal processing techniques known as Kalman filtering, and which will be reviewed later.

The method of the invention also comprises a method for extracting a time lag, which uses the first derived series and the second derived series to produce a series of values called "preparatory time series."

This preparatory time series consists of successive estimated values of an instantaneous time lag that is detected between the instantaneous height of the chassis and the instantaneous height of the wheel.

Each estimated value of this temporal shift is obtained at least by optimization of a function correlating the first derived time series and the second derived time series, where the latter including at least the derived principal time series and preferably also the derived auxiliary time series.

The techniques of construction and of optimization of a correlation function will also be reviewed later.

Finally, the method of the invention comprises a frequency estimation procedure that uses the preparatory time series to produce a final time series consisting of successive estimated values of the instantaneous frequency of the mechanical excitation exerted on the model subsystem by the uneven road surface on which the vehicle travels.

Each of these frequency values is obtained by the observation and processing of the preparatory time series in an observation time window whose duration is equal to or at least approximately equal to the corresponding estimated value of the instantaneous time lag.

Also, each frequency value is chosen to be the value of the frequency whose instantaneous phase shift is the instantaneous time lag obtained after completion of the time lag extracting procedure.

The fact that the latter characteristic is not highly intuitive justifies a review of the relation which relates the ideas of phase shift and of delay time.

In general, the instantaneous frequency ($v_i(t)$ of a signal $x(t)$ is expressed by:

$$v_i(t) = \frac{1}{2\pi} \frac{d \arg(Z)}{dt}(t)$$

with $Z(t)=x(t)+j \cdot H\{x(t)\}$, with:
$Z(t)$: analytic signal of $x(t)$
H: Hilbert transform In a dual representation, the group delay $\tau$ which characterizes the instant of appearance of a frequency $v$ is expressed by:

$$\tau(v) = -\frac{1}{2\pi} \frac{d \arg(Z)}{dv}(v).$$

Let the analytical signal $Z(t)=A(t) \cdot e^{j\Phi(t)}$, where $A(t)$ is the instantaneous amplitude, where $\Phi(t)$ is the instantaneous phase, where $A(t)=|Z(t)|$, and where $\Phi(t)=\arg(Z)$.

The instantaneous frequency can then be written:

$$v_i(t) = \frac{1}{2\pi} \frac{d\Phi(t)}{dt}$$

and the group delay time, that is to say the signal propagation time through the filters of the system, is written:

$$\tau = -\frac{d\Phi}{d\omega}$$

If, in addition, the model at the origin of this signal is known, that is to say if there exists an explicit relation of the type $\Phi=f(\omega)$, then the group delay time is expressed by:

$$\tau = -\frac{d\Phi}{d\omega} = -f'(\omega)$$

More concretely, if we let the monochromatic signal $x(t)=a \cdot \cos(\omega_i \cdot t + \phi_0)$, with amplitude $a$, pulse $\omega_i$, and original phase, then the associated analytical signal, given that $\omega_i = 2\pi \cdot v_i$, is given by:

$z(t) = a \cdot e^{j\phi_0} \cdot e^{j\omega_i \cdot t}$, where $|Z(t)|=a$ is the constant envelope, where
$\Phi_i(t)=2\pi v_i \cdot t + \phi_0$ is the instantaneous phase, where
$v_i(t)=v_i$ is the instantaneous frequency, and where
$\tau=-t$ is the group delay time.

In this case, the phase shift time, that is the time interval $\Delta t$ between two instants $t_2$ and $t_1$, is expressed by:

$$\Delta t = t_2 - t_1 = \frac{\varphi_i(t_2) - \varphi_i(t_1)}{\omega_i}.$$

However, for a system which is linear and time invariant, defined by a transfer function $H(\omega)$, it is conventional to use the term system response phase for the function $\phi(\omega)$ such that:

$H(\omega)=|H(\omega)|e^{-j\phi(\omega)}$,

This convention thus makes it possible to express the relation between the phase and the group propagation time or delay $\tau(\omega)$ by:

$\tau(\omega)=-d\phi/d\omega$

In the simplest case, the procedure for estimating the frequency elaborates each value of the final time series as the solution, for the corresponding estimated value of the instantaneous phase shift, of at least one equation representing the physical model associated with the modeled subsystem, that is to say with the system consisting of the wheel, the suspension devices and the part of the chassis supported by the wheel.

Figure 4A:
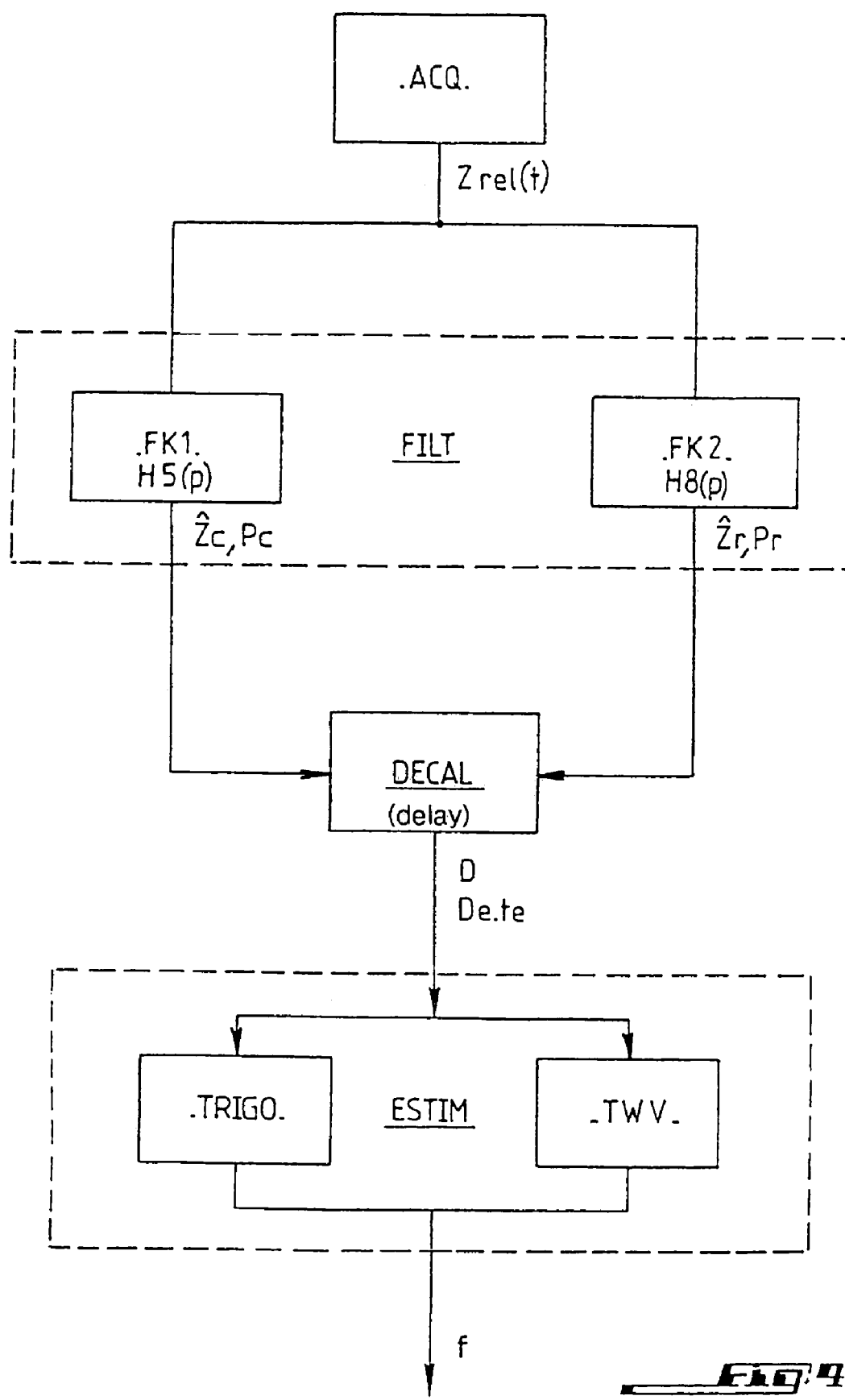
FIGS. 4A to 4C are diagrams representing three variants of a first embodiment of the method of the invention.

A first example of how the invention, as described up to this point, is carried out as shown schematically in FIG. 4A.

During the acquisition procedure ACQ, the following are elaborated, by means of a known displacement sensor: successive measurement samples $Zrel(t_1)$, $Zrel(t_2)$, $Zrel(t_3)$, etc., which represent successive values of the quantity Zrel, that is Zr−Zc, where this quantity thus constitutes a first observable parameter related to the instantaneous height Zc of the chassis and the instantaneous height Zr of the wheel.

The measurement time series Zrel(t) thus obtained simultaneously undergoes, in the context of the filtering procedure FILT, filtering in a first Kalman filter FK1 and filtering in a second Kalman filter FK2.

The first Kalman filter FK1 is constructed taking as a basis the transfer function:

$$H_5(p) = \frac{Zc(p)}{Zrel(p)},$$

and the second Kalman filter FK2 is constructed taking as a basis the transfer function:

$$H_8(p) = \frac{Zr(p)}{Zrel(p)}.$$

It should be recalled here that Kalman filtering is an iterative numerical calculation algorithm which determines the best possible estimate of the state of any dynamic system from measurement signals obtained by observation of this system and marred by errors due to generally random disturbances.

The state of the studied system is thus assumed to be capable of being described, at each instant k, by means of a vector of state variables, Xe, taking the value Xe(k) at the instant k, where this vector is a column vector of given dimension n.

The intrinsic capacity of this system to induce a change in its state from the value Xe(k) at the instant k to the value Xe(k+1) at the instant k+1 is defined by a so-called "transition" matrix, denoted A(k+1/k), and having the dimensions n×n.

Moreover, this system is subject to the influence of an input signal, also called "control," which is represented by a column vector of given dimension j (where the symbol j here represents a whole number and must not be confused with the imaginary number that has the same symbol) and takes the value denoted U(k) at the instant k.

The influence of the control U(k) on the capacity of the system to reach the state Xe(k+1) at the instant k+1 is defined by a so-called "control" matrix, denoted B(k) at the instant k, and having dimensions n×j.

In the general case, this system is also subject to the influence of state noise, which is represented by a column vector having dimension n and which takes the value denoted W(k) at the instant k, where the influence of the noise W(k) on the capacity of the system to reach the state Xe(k+1) at the instant k+1 is defined by a so-called "noise" matrix, denoted G(k) at the instant k, and having the dimensions n×n.

Overall, the variation of the state of the system between the instants k and k+1 is thus represented by the equation, called the "state equation," which has the form:

$$Xe(k+1)=A(k+1/k)Xe(k)+B(k)U(k)+G(k)W(k).$$

The manifestation of the behavior that the system adopts as a function of evolution of its state takes the form of an output signal, also called an "observation," represented by a column vector of given dimension m and taking the value denoted Ye(k) at the instant k.

The observation Ye(k) is related, on the one hand, to the state Xe(k) of the system at the instant k by a so-called "observation" matrix, denoted C(k) at the instant k and of dimension m×n, and on the other hand, it is related to the input signal U(k) by a so-called "control" matrix, denoted D(k) at the instant k and of dimension m×j, and finally, it includes so-called "observation" noise, which is represented by a column vector of dimension m denoted V(k) at the instant k.

Under these conditions, the observation Ye(k) is given by the equation, called the "observation equation," of the form:

$$Ye(k)=C(k)Xe(k)+D(k)\cdot U(k)+V(k).$$

The matrixes A(k+1/k), B(k), C(k), D(k) and G(k) can be obtained in a known manner, from the transfer function on the basis of which the Kalman filter under consideration is constructed.

Moreover, in the case of the first Kalman filter FK1, which is constructed on the basis of the transfer function $H_5(p)$ taking Zrel as input signal and Zc as output signal, the control U(k) consists of the successive values Zrel(t), and the observation Ye(k) consists of the successive values Zc(t), the vector U(k) thus also being known.

Similarly, in the case of the second Kalman filter FK2, which is constructed on the basis of the transfer function $H_8(p)$ taking Zrel as input signal and Zr as output signal, the control U(k) consists of the successive values Zrel(t), and the observation Ye(k) consists of the successive values Zr(t), the vector U(k) thus also being known.

The filtering procedure FILT thus assumes that the use of a prior modeling procedure, MOD, which comprises, for the physical model associated with the system consisting of the wheel, the suspension devices and the associated chassis, the elaboration of the transfer function $H_5(p)$ for realization of the filter FK1, and the elaboration of the transfer function $H_8(p)$ for realization of the filter FK2.

To the extent that, in contrast to the FILT filtering procedure that is used iteratively, the prior modeling procedure MOD is used only once in all, the latter procedure has not been represented in FIG. 4A for the sake of consistency.

By convention, the transfer function $H_5(p)$, which takes the first observable parameter Zrel as input signal and the instantaneous height of the chassis Zc the output signal, is denoted "first inverse transfer function," where the term "inverse" is justified by the fact that, at least from a strictly physical point of view, the instantaneous height of the chassis Zc serves as a co-acting cause, and not as an effect, in the determination of the displacement Zrel.

Analogously, the transfer function $H_8(p)$, to the extent that it takes the first observable parameter Zrel as input signal and the instantaneous height of the wheel Zr as output signal, can be denoted the "second inverse transfer function."

In the state and observation equations that have been explicated above, the state noise W(k) and estimate noise V(k) is a decorrelated white noise with zero mean and known covariance.

The initial state Xe(0) is random, with known mean $\overline{X}e(0)$ and covariance P(0). Moreover, it is independent of state-related and observation-related noise.

From all these known elements, the goal of Kalman filtering is, in a known manner, to find, given the observations Ye(k+1) corresponding to the states Xe(k+1) which are defined on the basis of the prior states Xe(k), the estimate $\hat{X}e(k+1)$ which minimizes the error ($\hat{X}e(k+1)-Xe(k+1)$).

Thus, this filtering not only provides the estimate of $\hat{Y}e(k+1)$ of Ye(k+1), but also the corresponding variance P(k+1) for each value of k.

Under these conditions, the first Kalman filter FK1 thus produces a first "derived" time series, that is a series which results from processing, and includes a first derived principal time series which consists of successive estimates of the instantaneous height of the chassis, that is of successive samples which are representative of the estimate $\hat{Z}c$ of the magnitude Zc, and a first derived auxiliary time series which consists of successive variance values that are respectively associated with the estimates of the first derived principal time series, that is it consists of successive samples which are representative of the variance Pc of the magnitude $\hat{Z}c$.

In the same manner, the second Kalman filter FK2 generates a second "derived" time series which includes a second derived principal time series, which consists of successive estimates of the instantaneous height of the wheel, that is of successive samples representative of the estimate $\hat{Z}r$ of the magnitude Zr, and a second derived auxiliary time series, which consists of successive variance values that are respectively associated with the estimates of the second derived principal time series, that is to say it consists of successive samples representative of the variance Pr of the magnitude $\hat{Z}r$.

The two derived series so obtained, that is $\hat{Z}c$, Pc on the one hand, and $\hat{Z}r$, Pr on the other hand, are then processed using the procedure for extracting a time lag, DECAL, which supplies, at the output, a series of values called a "preparatory time series" that consists of successive estimated values of an instantaneous time lag D evidenced between the instantaneous height of the chassis and the instantaneous height of the wheel.

The person skilled in the art will understand that this time lag, although denoted "D," must not be at all confused with the above-mentioned control matrix D(k).

The principle of extracting this lag is based on the basic model which is reviewed below.

Let two signals x(t) and y(t), which are not stationary and which are random, originate from the observation of a dynamic system.

These signals x(t) and y(t), moreover, are assumed to contain the same useful signal s(t), which is considered to be stationary in a given window of observation.

The signals x(t) and y(t) then satisfy the following relations:

$$x(t)=s(t)+w_x(t), \text{ and}$$

$$y(t)=A \cdot s(t-D)+w_y(t),$$

where D represents the delay, to be estimated, which the signal y(t) exhibits with respect to the signal x(t), where $w_x(t)$ and $w_y(t)$ are Gaussian noise with zero mean, and where A, not to be confused with the transition matrix A(k+1/k) mentioned above, represents the relative amplitude of the signal y(t) with reference to the signal x(t).

The principle of extraction the time lag D consists in correlating the signals x(t) and y(t), that is it consists in applying to the signal y(t) successive time lags τ, in comparing the signal x(t) with the signal y(t) so obtained, and in setting the delay D equal to the lag τ which leads to the greatest similarity between the signal y(t) so obtained and the signal x(t).

In concrete terms, this correlation can be carried out using several formal techniques.

A first technique consists in calculating, for each value of the lag τ, the intercorrelation function of the signals x(t) and y(t).

For the signals x(t) and y(t) which satisfy the relations $$x(t)=s(t)+w_x(t), \text{ and}$$

$$y(t)=A \cdot s(t-D)+w_y(t),$$

the intercorrelation function $R_{xy}(\tau)$ of these signals x(t) and y(t) takes the formula;

$$R_{xy}(\tau)=A \cdot R_{ss}(\tau-D)+R_{wx, wy}(\tau),$$

where $R_{ss}(\tau)$ is the auto-correlation function of the signal s(t), and where $R_{wx, wy}(\tau)$ is the intercorrelation function between noises $w_x(t)$ and $w_y(t)$, where the cross terms involve the useful signal s(t) and noises $w_x(t)$ and $w_y(t)$ approach zero, given that the noise is Gaussian while the useful signal s(t) is assumed to be stationary in the window of observation.

Provided that noises $w_x(t)$ and $w_y(t)$ are not correlated, the intercorrelation function $R_{xy}(\tau)$ must represent a maximum for a value of τ which then represents the delay D to be estimated.

As applied in the invention, this technique is carried out to estimate, primarily, the time lag between the successive samples which are representative of the estimate $\hat{Z}$ c of the quantity Zc and the successive samples which are representative of the estimate $\hat{Z}$ r of the quantity Zr, which thus play the role of the signals x(t) and y(t).

To the extent that the variances Pc and Pr of the samples are equally available, it is equally possible to calculate the intercorrelation function on recalculated samples which are located, with reference to the original samples of the derived principal time series $\hat{Z}$ c and $\hat{Z}$ r, in respective tolerance ranges compatible with the variances Pc and Pr.

In practice, the technique of extracting a time lag by calculating the intercorrelation function is, however, usable only under relatively favorable conditions.

Indeed, the finite dimension of the window of observation can degrade the validity of the hypotheses made regarding the nature of the noise, and the intercorrelation function $R_{xy}(\tau)$ then risks presenting a relatively spread out maximum, no observable peak, or peaks of the same amplitude.

To nevertheless extract the desired time lag D, it is appropriate to use a correlation technique which is less sensitive to noise, and which can consist of the method of third-order cumulants that is reviewed below.

The above-mentioned signals x(t) and y(t), being assumed to be sampled with a sampling period "$t_e$," and the instant "t" being assumed to correspond to a number "n" of periods "$t_e$," can be symbolically rewritten in the following form:

$$x(n)=s(n)+w_x(n), \text{ and}$$

$$y(n)=A \cdot s(n-D_e)+w_y(n),$$

where $D_e$ is a whole number, which can be estimated, equal to Ent ($D/t_e$), where the symbol Ent itself stands for the "whole part" function Let P be the expected maximum value of the delay $D_e$, where this value P obviously should not be confused with the derivation operator "p" in the Laplace transform.

Using the notation adopted by a model known to the person skilled in the art under the acronym "ARMA" (from the English "Auto Regressive Moving Average"), the signal y(n) can be rewritten in the form:

$$y(n) = \sum_{i=-P}^{P} a(i) \times (n-i) + w(n)$$

where a(n) is a relative quantity of zero value for any value of "n" different from $D_e$, and equal to A for n=$D_e$, and where "i" is a counter index representing a whole number.

Under these conditions, the third-order cumulants are expressed, taking as a basis the mathematical probabilities E, the complex conjugates x*(n) and y*(n) of x(n) and y(n), and two temporal variables τ and ρ representing whole numbers of sampling periods $t_e$, by the relations:

$$C_{yxx}(\tau,\rho):=E\{y^*(n) \times (n+\tau) \times (n+\rho)\}$$

$$C_{xxx}(\tau,\rho):=E\{x^*(n) \times (n+\tau) \times (n+\rho)\}$$

Using the work of Nikias and Pan (Nikias, C. L. and R. Pan "Time delay estimation in unknown Gaussian spatially correlated noise," IEEE Trans. ASSP, Vol. 36, pp. 1706-14, November 1988), it is possible to identify a relation between these cumulant values, which takes the following recursive form:

$$C_{yxx}(\tau, \rho) = \sum_{i=-P}^{P} a(i) C_{xxx}(\tau + i, \rho + i)$$

This relation, which is written for different values of the two temporal variables τ and ρ, forms a system of linear equations in a(i) having the form:

$$C_{xxx} \alpha = C_{yxx}.$$

Solving this system of equations makes it possible, by seeking the maximum of the quantity |a(i)|, to identify the value "j" of the index "i" at which this maximum is reached, and the delay $D_e$ to be estimated is then set equal to that value.

The expected maximum value P of the delay $D_e$ is chosen depending on the degree of knowledge of the modeled system, where this value can initially have a relatively high value and be adjusted in real time to the value that is found for the delay $D_e$ as knowledge of the observed process becomes more refined, and the value P then represents the window of observation of the signal.

To the extent that it eliminates Gaussian noise, the technique based on the use of third-order cumulants is particularly powerful.

As in the case of the technique using an intercorrelation function, the technique which employs third-order cumulants is concretely used by attributing the role of the signals x(n) and y(n) to the successive samples that are representative of the estimates $\hat{Z}$ c, and to the successive samples that are representative of the estimates $\hat{Z}$ r, and/or to the samples which were recalculated taking into account the variances Pc and Pr.

The preparatory time series which is represented by the successive values of the delay D, optionally expressed in the form of $D_e \cdot t_e$, is then processed using the frequency estimation procedure ESTIM which produces at the output a final time series consisting of successive estimated values of the instantaneous frequency "f" of the mechanical excitation that the uneven road surface exerts on which the vehicle travels on the modeled subsystem.

Each one of the instantaneous values assigned to the desired frequency f by the frequency estimation procedure ESTIM is obtained by observation and processing of the preparatory time series in an observation time window of equal or at least approximately equal duration to the corresponding estimated value of the instantaneous time lag $D_e$.

The description of the principle of this estimate justifies reviewing the transfer functions which have already been presented above, namely:

$$H_1(p) = \frac{Zr(p)}{Zs(p)}, H_2(p) = \frac{Zc(p)}{Zs(p)}, \text{ and } H_4(p) = \frac{Zc(p)}{Zr(p)}.$$

If: $\phi_c(p)$ denotes the phase shift between the signals Zc(p) and Zs(p), and $\phi_r(p)$ the phase shift between the signals Zc(p) and Zs(p),
Then:

$$\varphi_c(p) = \arg\left(\frac{Zc(p)}{Zs(p)}\right),$$

where "arg" designates the function "argument,"

$$\varphi_r(p) = \arg\left(\frac{Zr(p)}{Zs(p)}\right), \text{ and}$$

$$\varphi_c(p) - \varphi_r(p) = \arg\left(\frac{Zc(p)}{Zr(p)}\right) = \arg(H_4(p)).$$

However, in the case where the behavior of the observed system does not lead to questioning the validity of the associated physical model, the function $H_4(p)$ is known and equal to:

$$H_4(p) = \frac{Zc(p)}{Zr(p)} = \frac{(Kc + Rp)}{Mcp^2 + Rp + Kc},$$

so that the desired frequency "f," which is related to the angular frequency ω by the relation f=ω/2·π, can be calculated on the basis of the relation:

$$\varphi_c - \varphi_r = arg(H_4(j\omega)) = \arctg\left(\frac{R\omega}{K_c}\right) - \arctg\left(\frac{R\omega}{K_c - M_c\omega^2}\right).$$

This technique, which is identified by the reference TRIGO in FIG. 4A, has the advantage of being relatively easy to use.

However, it may happen that the behavior of the observed system leads to temporarily questioning the validity of the associated physical model.

This is the case, for example, if the estimates of Zc(p) and Zr(p) show that the wheel of the observed subsystem has left the ground.

In this case, it may be advantageous to use time-frequency processing techniques which are more sophisticated, and whose range of validity is not restricted to that of the observed subsystem.

Several techniques known to the person skilled in the art can be used for this purpose, notably the techniques known under the names of "wavelet transform," and "Wigner-Ville transform."

The underlying idea of the wavelet transform technique consists in decomposing a signal into a family of elementary signals, of which the signal is assumed to be a linear superposition.

To obtain both time domain and frequency domain information on a signal x(t), the latter must be decomposed into both time and frequency concentrated functions.

These functions are defined starting from a function ψ(t), called a parent wavelet, if it is well localized and if it is oscillating, this name being a reminder that the function resembles a wave whose amplitude is, however, small to the extent that it is localized.

Two conditions are then necessary to define these functions: one concerns their localization with a rapid decrease when t increases indefinitely, and the other requires ψ(t) to vibrate like a wave.

The parent of the wavelets generates the other wavelets of the family $\psi_{a,b}(t)$, by a dilation which is defined by a parameter a, and by a translation in time which is defined by a parameter b.

$$\psi_{a,b}(t) = \frac{1}{\sqrt{a}} \psi\left(\frac{t-b}{a}\right) \text{ with } a > 0 \text{ and } b \text{ real}$$

Any finite energy signal can then be written as a linear combination of wavelets $\psi_{a,b}(t)$, and the coefficients of this combination are the scalar products:

$$C(a,b) = \frac{1}{\sqrt{a}} \int_{-\infty}^{+\infty} x(t)\psi\left(\frac{t-b}{a}\right) dt$$

These coefficients measure, in a certain sense, the fluctuations of the signal x(t) around the point b at the scale supplied by a, where this operation is called "continuous wavelet transform."

By construction, such a transform is more of a time-scale representation than a time-frequency representation, but it can supply, for wavelets that are well localized in terms of frequency around a value $f_0$, a time-frequency interpretation using the formal identification $f=f_0/a$.

The Wigner-Ville transform technique, which will be referred to using the acronym TWV used in FIG. 4A, requires, for the treatment of real signals, the use of the analytical signals that are associated with these real signals.

If x(t) denotes a real signal, the analytical signal z(t) associated with it is defined by:

$$z(t)=x(t)+iHx(t),$$

where H here denotes the Hilbert transform, not to be confused with the transfer functions mentioned above, and where "i" denotes the imaginary number basis.

If z(f) and x(f) represent the respective Fourier transforms, the following property is equivalent to the definition given by the above equation:

$$z(f) = \begin{cases} 2x(f) & \text{if } f > 0 \\ x(f) & \text{if } f = 0 \\ 0 & \text{if } f < 0 \end{cases}$$

All information contained in the original real signal is found, in a different form, in the corresponding analytical signals.

The principal reasons for using the analytical signal in the TWV relate to the interference problem which results from the formal reference to negative frequencies, and to the need to oversample the real time signal.

By definition, the Wigner-Ville transform associated with an analytical signal Z consists of the function $W_z$ of two time and frequency variables which satisfies the relation:

$$W_z(t, f) = \int_{-\infty}^{+\infty} Z\left(t + \frac{\tau}{2}\right) Z^*\left(t - \frac{\tau}{2}\right) e^{-2i\pi f \tau} d\tau.$$

The power of the technique of the TWV resides in the fact that the normalized moments of order 0 and of order 1 directly supply the instantaneous frequency $f_x(t)$ and the group delay of the real signal thanks to the relation:

$$f_x(t) = \frac{\int_{-\infty}^{+\infty} f \cdot W_z(t, f) df}{\int_{-\infty}^{+\infty} W_z(t, f) df}.$$

One difficulty may arise in the use of the TWV, related to the fact that calculation of this transform takes into account the totality of the signal and the fact that it is a priori feasible only for signals of finite duration, while in practice the duration of observation is often shorter than that of the total signal.

This problem can nevertheless be solved by using an evolved version of the TWV, called pseudo-Wigner-Ville transformation, which makes it possible to apply the TWV to a portion of the signal that has been cut out by an observation window.

Figure 4B:
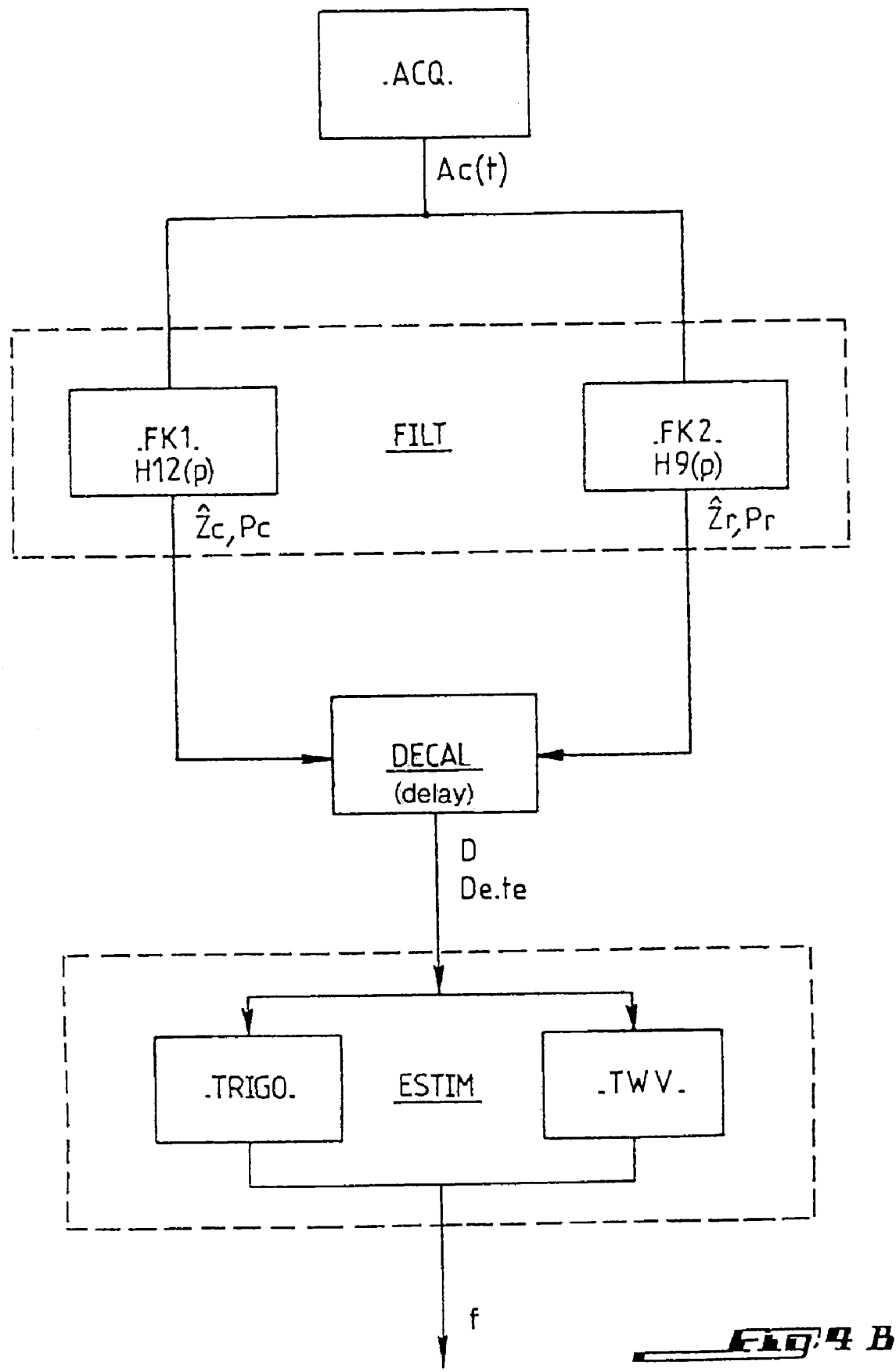
Figure 4C:
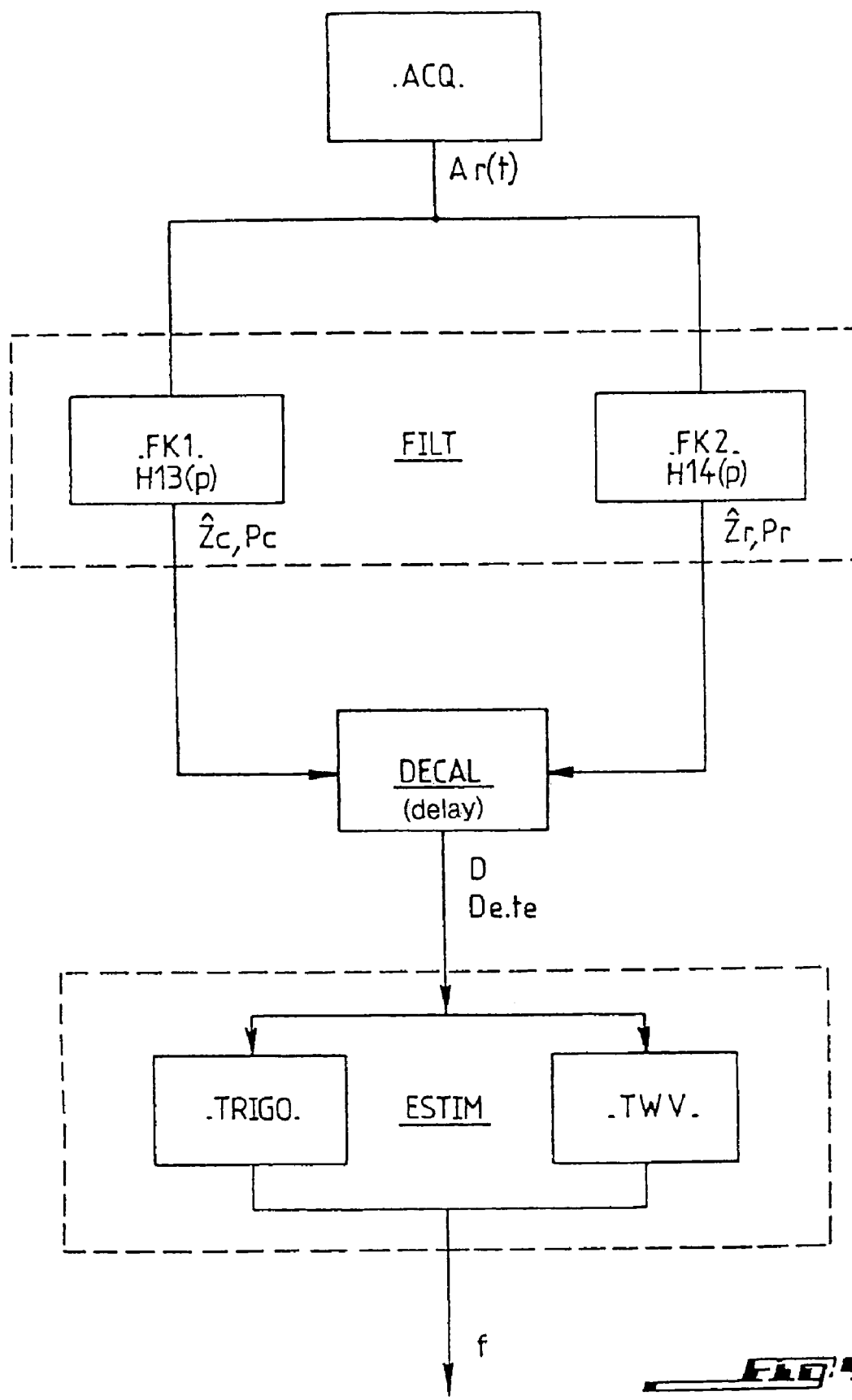

The method which has been described up to this point can be the object of other variants which are illustrated in the FIGS. 4B and 4C.

A variant (FIG. 4B) consists in using, as the first observable parameter, the instantaneous acceleration Ac of the chassis, in constructing the first Kalman filter FK1 from the transfer function:

$$H_{12}(p) = \frac{Zc(p)}{Ac(p)} = H_5(p) \cdot H_6(p) = \frac{1}{p^2}$$

and in constructing the second Kalman filter FK2 from the transfer function:

$$H_9(p) = \frac{Zr(p)}{Ac(p)}.$$

Another variant (FIG. 4C) consists in using, as a first observable parameter, the instantaneous acceleration Ar of the wheel, in constructing the first filter FK1 from the transfer function $$H_{13}(p) = \frac{Zc}{Ar} = H_5(p) \cdot H_{11}(p),$$

and in constructing the second Kalman filter FK2 from the transfer function:

$$H_{14}(p) = \frac{Zr}{Ar} = H_8(p) \cdot H_{11}(p).$$

Figure 5A:
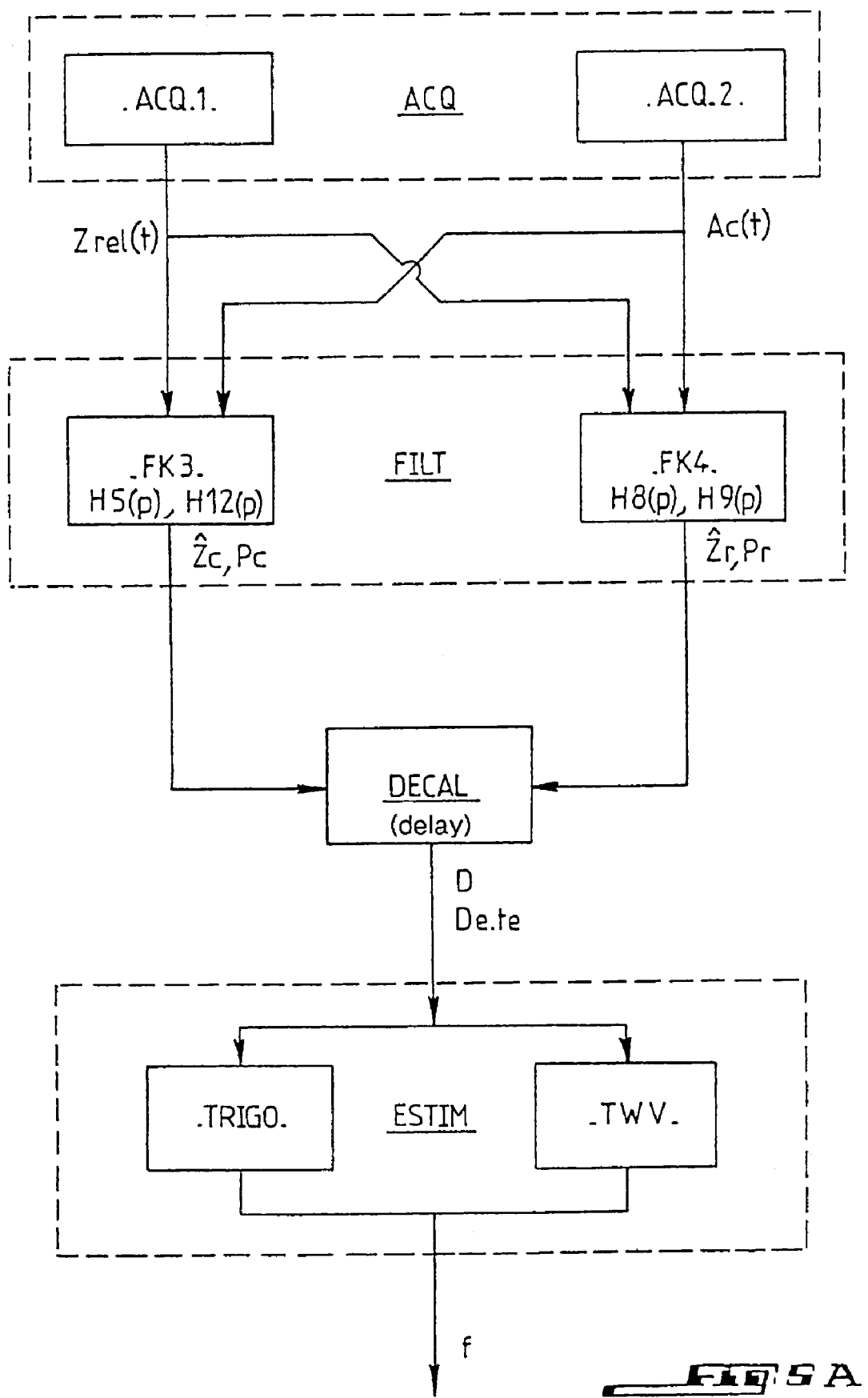

FIG. 5A illustrates a first variant of another embodiment of the invention, which requires the use of two observable parameters which are related to the instantaneous height of the chassis and/or of the wheel, in this instance the relative displacement Zrel of the wheel with respect to the chassis (Zrel=Zr−Zc), and the vertical acceleration of the chassis Ac.

In this case, the acquisition procedure ACQ comprises two acquisition subprocedures ACQ_1 and ACQ_2 which elaborate the first measurement time series Zrel and the second measurement time series Ac, respectively.

The prior modeling procedure MOD then comprises, for the physical model which is associated with the system consisting of the wheel, the suspension devices and the chassis, not only the elaboration of the transfer function $H_5(p)$, which takes Zrel as input signal and Zc as output signal, and the transfer function $H_8(p)$, which takes Zrel as input signal and Zr as output signal, but also the elaboration of the transfer function $H_{12}(p)$, which takes Ac as the input signal and Zc as output signal, and of the transfer function $H_9(p)$, which takes Ac as input signal and Zr as output signal.

The filtering procedure FILT then uses two Kalman filters FK3 and FK4 which supply the first derived time series and the second derived time series, respectively, that is $\hat{Z}$ c, Pc on the one hand, and $\hat{Z}$ r, Pr on the other hand, where the filter FK3 is constructed, for example, taking as a basis the transfer functions $H_5(p)$ and $H_{12}(p)$, and the filter FK4 is constructed taking as a basis the transfer functions $H_8(p)$ and $H_9(p)$.

On the basis of production of the derived time series, processing can be continued as in the embodiment that was described with reference to FIGS. 4A-4C.

Figure 5B:
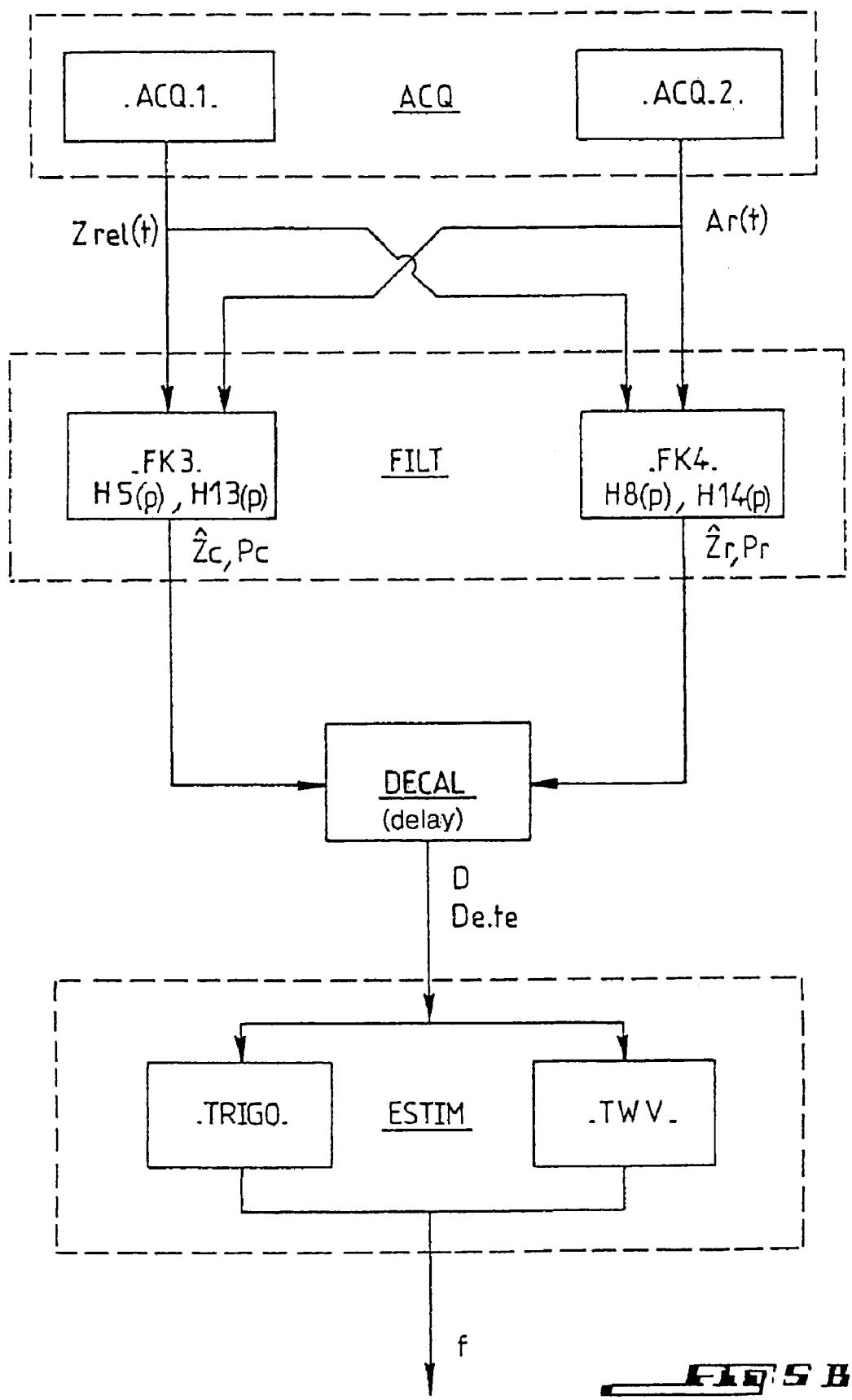

FIG. 5B illustrates another variant of the embodiment of the invention which requires the use of two observable parameters related to the instantaneous height of the chassis and/or of the wheel, where the variant in this instance uses the relative travel Zrel of the wheel with respect to the chassis (Zrel=Zr−Zc), and the vertical acceleration of the wheel Ar.

In this case, the acquisition procedure ACQ comprises two acquisition subprocedures ACQ_1 and ACQ_2 which elaborate the first measurement time series Zrel and the second measurement time series Ar, respectively.

The prior modeling procedure MOD then comprises, for the physical model associated with the system which consists of the wheel, the suspension devices and the chassis, not only the elaboration of the transfer function $H_5(p)$ which takes Zrel as input signal and Zc as output signal, and of the transfer function $H_8(p)$ which takes Zrel as input signal and Zr as output signal, but also the elaboration of the transfer function $H_{13}(p)$ which takes Ar as the input signal and Zc as output signal, and of the transfer function $H_{14}(p)$ which takes Ar as input signal and Zr as output signal.

The filtering procedure FILT then uses two Kalman filters FK3 and FK4, which supply the first derived time series and the second derived time series, that is $\hat{Z}$ c, Pc on the one hand, and $\hat{Z}$ r, Pr on the other hand, where the filter FK3 is constructed, for example, taking as a basis the transfer functions $H_5(p)$ and $H_{13}(p)$, and the filter FK4 is constructed taking as a basis the transfer functions $H_8(p)$ and $H_{14}(p)$.

On the basis of production of the derived time series, processing can be continued as in the embodiment that was described with reference to FIGS. 4A-4C.

FIG. 5C illustrates another variant of the embodiment which requires the use of two observable parameters related to the instantaneous height of the chassis and/or of the wheel, where this variant in this instance uses the vertical acceleration of the chassis Ac and the vertical acceleration of the wheel Ar.

In this case, the acquisition procedure ACQ comprises two acquisition subprocedures ACQ_1 and ACQ_2, which elaborate the first measurement time series Ac and the second measurement time series Ar, respectively.

The prior modeling procedure MOD then comprises, for the physical model associated with the system which consists of the wheel, the suspension devices and the chassis, not only the elaboration of the transfer function $H_{12}(p)$ which takes Ac as input signal and Zc as output signal, and of the transfer function $H_9(p)$ which takes Ac as input signal and Zr as output signal, but also the elaboration of the transfer function $H_{13}(p)$ which takes Ar as input signal and Zc as output signal, and of the transfer function $H_{14}(p)$ which takes Ar as input signal and Zr as output signal.

The filtering procedure FILT then uses two Kalman filters FK3 and FK4 which supply the first derived time series and the second derived time series, respectively, that is $\hat{Z}$ c, Pc on the one hand and $\hat{Z}$ r, Pr on the other hand, where the filter FK3 is then constructed, for example, taking as a basis the transfer functions $H_{12}(p)$ and $H_{13}(p)$, and the filter FK4 taking as a basis the transfer functions $H_9(p)$ and $H_{14}(p)$.

On the basis production of the derived time series, processing can be continued as in the embodiment that was described with reference to FIGS. 4A-4C.

Figure 6A:
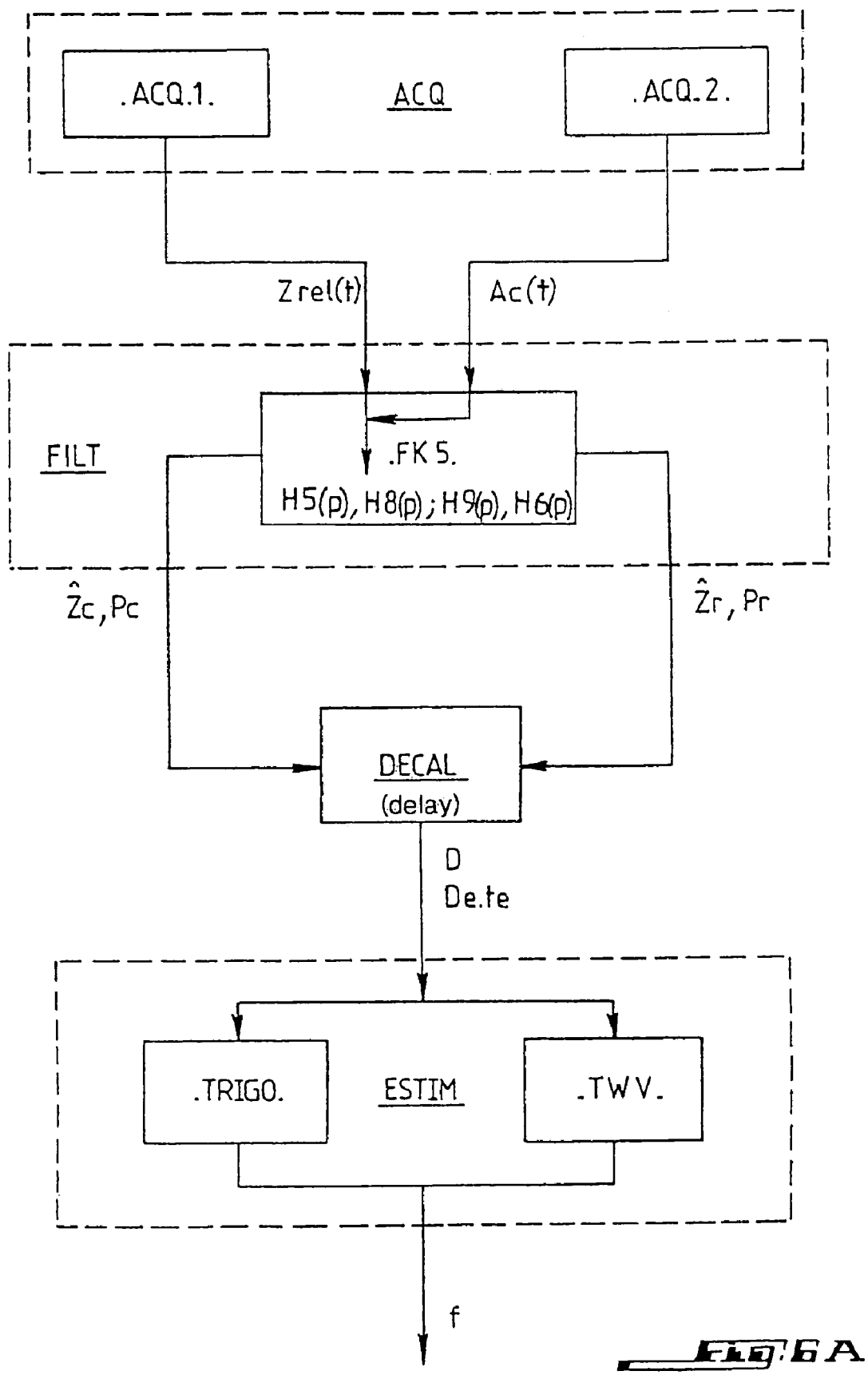

FIG. 6A illustrates a first variant of the third embodiment of the invention, which also requires the use of two observable parameters Zrel and Ac, where the acquisition procedure ACQ thus again comprises two acquisition subprocedures ACQ_1 and ACQ_2 which elaborate the first measurement time series Zrel and the second measurement time series Ac, respectively.

In this case, in addition to the elaboration of the transfer functions $H_5(p)$ and $H_8(p)$, the prior modeling procedure MOD comprises, for example, the elaboration of the transfer function $H_9(p)$ which takes Ac as input signal and Zr as output signal, and of the transfer function $H_6(p)$ which takes Ac as input signal and Zrel as output signal.

The filtering procedure FILT then uses only a single Kalman filter FK5, which is constructed taking as a basis all these transfer functions, and which supplies the two derived time series, that is $\hat{Z}$ c, Pc on the one hand and $\hat{Z}$ r, Pr on the other hand.

Subsequent processing can be carried out on the basis of production of the derived time series, as in the embodiment described with reference to FIGS. 4A-4C.

Figure 6B:
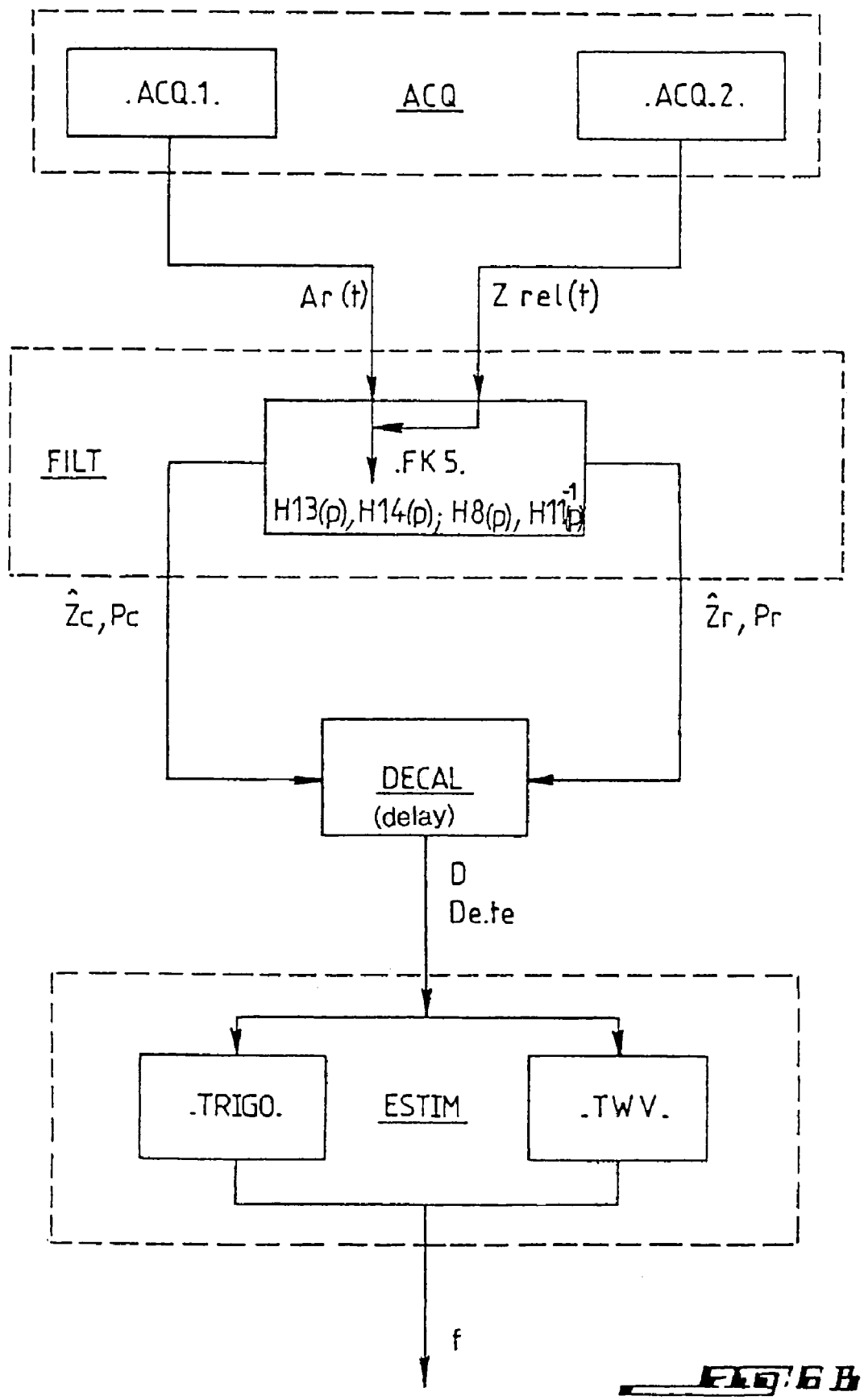

FIG. 6B illustrates a second variant of the third embodiment of the invention, which requires, in this instance, the use of two observable parameters Ar and Zrel, where the acquisition procedure ACQ thus again comprises two acquisition subprocedures ACQ_1 and ACQ_2, which elaborate the first measurement time series Ar and the second measurement times series Zrel, respectively.

In this case, in addition to the elaboration of the transfer functions $H_{13}(p)$ and $H_{14}(p)$, the prior modeling procedure MOD comprises, for example, the elaboration of the transfer function $H_8(p)$ which takes Zrel as input signal and Zr as output signal, and of the transfer function $H_{11}^{-1}(p)$ which takes Zrel as input signal and Ar as output signal.

The filtering procedure FILT then uses only one Kalman filter FK5, which is constructed taking as a basis all these transfer functions, and which supplies the two derived time series, that is $\hat{Z}$ c, Pc on the one hand and $\hat{Z}$ r, Pr on the other hand.

Subsequent processing can be carried out on the basis of production of the derived time series, as in the embodiment described with reference to FIGS. 4A-4C.

FIG. 6C illustrates a third variant of the third embodiment of the invention, which requires, in this instance, the use of two observable parameters Ac and Ar, where the acquisition procedure ACQ thus again comprises two acquisition subprocedures ACQ_1 and ACQ_2, which elaborate the first measurement time series Ac and the second measurement time series Ar, respectively.

In this case, in addition to the elaboration of the transfer functions $H_{12}(p)$ and $H_9(p)$, the prior modeling procedure MOD comprises, for example, the elaboration of the transfer function $H_{14}(p)$ which takes Ar as input signal and Zr as output signal, and of the transfer function $H_4(p)$ which takes Ar as input signal and Ac as output signal.

The filtering procedure FILT then uses only a single Kalman filter FK5, which is constructed taking as a basis all these transfer functions, and which supplies the two derived time series, that is $\hat{Z}$ c, Pc on the one hand, and $\hat{Z}$ r, Pr on the other hand.

Subsequent processing can be carried out on the basis of production of the derived time series, as in the embodiment that was described with reference to FIGS. 4A-4C.

The third embodiment illustrated in FIGS. 6A-6C uses a master sensor to estimate the quantities $\hat{Z}$ c and $\hat{Z}$ r, and a second sensor to confirm.

In the variants corresponding to FIGS. 6A-6C, the (master, slave) pair is successively:

{Zrel, $A_c$}

{$A_r$, Zrel} and

{$A_c$, $A_r$}.

However, as the person skilled in the art will understand after reading the above, it would also be possible to use the following (master, slave) pairs:

{Zrel, $A_r$}, {$A_c$, Zrel} and {$A_r$, $A_c$}.

Moreover, instead of confirming $Z_r$ and the first observation (sensor), the second sensor can be associated with a single filter to estimate the quantities $\hat{Z}$ c and $\hat{Z}$ r.

The method can be used in multiple applications, and in particular it can be used to allow determination of control of the suspension devices, determination of the instantaneous inclination of the chassis of a vehicle, or determination of the uneven road surface on which this vehicle travels.

In addition, to the extent that it exploits the properties of Kalman filtering, which make it possible to take into account modeling errors, the method of the invention can be applied to the determination of parameters which can change, for example, to monitoring the inflation of a vehicle wheel, to monitoring the vehicle mass, or to monitoring the parameters of a suspension.

What is claimed is:

1. A method for evaluating the instantaneous frequency of a mechanical excitation exerted by an uneven surface of a road on a wheel of a motor vehicle which travels on the road and includes a chassis connected to the wheel by suspension devices, the method including:

acquiring and elaborating at least a first measurement time series that consists of successive measurement samples representing successive values of a first observable parameter related to instantaneous height of one of the chassis and the wheel;

filtering, which uses at least the first measurement time series, to produce at least a first derived principal time series which consists of successive estimates of the instantaneous height of the chassis, and a second derived principal time series, which consists of successive estimates of the instantaneous height of the wheel, a prior modeling procedure comprising, for a physical model associated with a system that consists of the wheel, the suspension devices, and the chassis, elaborating a first inverse transfer function which takes the first observable parameter as an input signal and produces the instantaneous height of the chassis as an output signal, and elaborating a second inverse transfer function which takes the first observable parameter as an input signal and produces the instantaneous height of the wheel as an output signal, extracting a time lag, using at least the first derived principal series and the second derived principal series, to produce a preparatory time series that consists of successive estimated values of an instantaneous time delay between the instantaneous height of the chassis and the instantaneous height of the wheel, wherein each estimated value of the time lag is obtained by optimization of at least one function for correlation of the first derived principal time series and the second principal derived time series, and estimating a frequency, using the preparatory time series to produce a final time series, consisting of successive estimated values of the instantaneous frequency of the mechanical excitation, wherein each frequency value is obtained, in an observation time window defined by the corresponding estimated value of the instantaneous time delay, as the frequency for which the instantaneous time delay constitutes an instantaneous phase shift.

2. The method according to claim 1, wherein at least some of the measurement samples acquired and elaborated and which pertain to an observable parameter represent relative travel of the chassis with reference to the wheel.

3. The method according to claim 1, wherein at least some of the measurement samples acquired and elaborated and which pertain to the first observable parameter represent instantaneous acceleration of the chassis.

4. The method according to claim 1, wherein at least some of the measurement samples acquired and elaborated and which pertain to the first observable parameter represent instantaneous acceleration of the wheel.

5. The method according to claim 1, wherein acquiring and elaborating comprises elaborating at least a second measurement time series, which consists of successive measurement samples that represent successive values taken by a second observable parameter that is related to the instantaneous height of one of the chassis and of the wheel.

6. The method according to claim 1, wherein the prior modeling comprises, for the physical model associated with the system that consists of the wheel, the suspension devices, and the chassis, elaborating a third inverse transfer function which takes the second observable parameter as an input signal and produces the instantaneous height of the chassis as an output signal, and elaborating a fourth inverse transfer function which takes the second observable parameter as an input signal and produces the instantaneous height of the wheel as an output signal.

7. The method according to claim 1, wherein the prior modeling comprises, for the physical model associated with the system that consists of the wheel, the suspension devices, and the chassis, elaborating a fifth inverse transfer function which takes the second observable parameter as an input signal and produces one of the instantaneous height of the chassis and of the wheel as an output signal, and elaborating a sixth inverse transfer function which takes the second observable parameter as an input signal and produces the first observable parameter as an output signal.

8. The method according to claim 1, wherein the filtering uses at least one Kalman filter.

9. The method according to claim 1, wherein the filtering uses at least two Kalman filters.

10. The method according to claim 1, wherein, in estimating a frequency, elaborating each value of the final time series as the solution, for the corresponding estimated value of the instantaneous phase shift, of at least one equation representing the physical model associated with the system which consists of the wheel, the suspension devices, and the chassis.

11. The method according to claim 1, wherein, in estimating a frequency, elaborating each value of the final time series by application of a Wigner-Ville transform or of a pseudo-Wigner-Ville transform.

12. The method according to claim 1 including controlling the suspension devices.

13. The method according to claim 1 including determining instantaneous inclination of the chassis.

14. The method according to claim 1 including determining the uneven surface of the road.

15. The method according to claim 1 including monitoring the inflation of a tire on the wheel.

16. The method according to claim 1 including monitoring mass of the vehicle.

17. The method according to claim 1 including monitoring the suspension devices of the vehicle.

18. A method for evaluating the instantaneous frequency of a mechanical excitation exerted by an uneven surface of a road on a wheel of a motor vehicle which travels on the road and includes a chassis connected to the wheel by suspension devices, the method including:

acquiring and elaborating at least a first measurement time series that consists of successive measurement samples representing successive values of a first observable parameter related to instantaneous height of one of the chassis and the wheel;

filtering, which uses at least the first measurement time series, to produce at least a first derived principal time series which consists of successive estimates of the instantaneous height of the chassis, and a second derived principal time series, which consists of successive estimates of the instantaneous height of the wheel, extracting a time lag, using at least the first derived principal series and the second derived principal series, to produce a preparatory time series that consists of successive estimated values of an instantaneous time delay between the instantaneous height of the chassis and the instantaneous height of the wheel, wherein each estimated value of the time lag is obtained by optimization of at least one function for correlation of the first derived principal time series and the second principal derived time series, and estimating a frequency, using the preparatory time series to produce a final time series, consisting of successive estimated values of the instantaneous frequency of the mechanical excitation, wherein each frequency value is obtained, in an observation time window defined by the corresponding estimated value of the instantaneous time delay, as the frequency for which the instantaneous time delay constitutes an instantaneous phase shift, wherein the filtering uses at least the first measurement time series to produce a first derived time series which comprises, in addition to the first derived principal time series, a first derived auxiliary time series that consists of successive variance values respectively associated with the estimates of the first derived principal time series, and a second derived time series which comprises, in addition to the second derived principal time series, a second derived auxiliary time series, that consists of successive variance values respectively associated with the estimates of the second derived principal time series, and obtains each estimated value of the time delay by optimization of at least one function for correlation of the first derived time series and the second derived time series.

19. The method according to claim 18, wherein each function for correlation of the first derived time series and the second derived time series consists of an intercorrelation function of the first derived time series and the second derived time series.

20. The method according to claim 19, including constructing each function for correlation of the first derived time series and of the second derived time series using a model based on third-order cumulants.

* * * * *